United States Patent
Ebrahimi Afrouzi

(10) Patent No.: US 11,086,314 B1
(45) Date of Patent: Aug. 10, 2021

(54) AUTONOMOUS SIGNAL BOOSTING ROBOTIC DEVICE

(71) Applicant: Ali Ebrahimi Afrouzi, San Jose, CA (US)

(72) Inventor: Ali Ebrahimi Afrouzi, San Jose, CA (US)

(73) Assignee: AI Incorporated, Toronto (CA)

( * ) Notice: Subject to any disclaimer, the term of this patent is extended or adjusted under 35 U.S.C. 154(b) by 288 days.

(21) Appl. No.: 16/243,524

(22) Filed: Jan. 9, 2019

Related U.S. Application Data

(63) Continuation-in-part of application No. 16/127,038, filed on Sep. 10, 2018.

(60) Provisional application No. 62/615,435, filed on Jan. 9, 2018.

(51) Int. Cl.
*G06F 7/00* (2006.01)
*G05D 1/00* (2006.01)

(52) U.S. Cl.
CPC .......... *G05D 1/0022* (2013.01); *G05D 1/0088* (2013.01)

(58) Field of Classification Search
USPC .................................. 700/213, 228; 701/23
See application file for complete search history.

(56) References Cited

U.S. PATENT DOCUMENTS

| | | | |
|---|---|---|---|
| 5,409,347 A | 4/1995 | Suzuki | |
| 7,556,108 B2 | 7/2009 | Won | |
| 8,892,256 B2 * | 11/2014 | Friedman | B25J 13/086 700/255 |
| 2017/0355076 A1 * | 12/2017 | Gordon-Carroll | B25J 11/008 |
| 2018/0021954 A1 * | 1/2018 | Fischer | B25J 13/089 700/253 |
| 2020/0073352 A1 * | 3/2020 | Wang | G05B 15/02 |

FOREIGN PATENT DOCUMENTS

| | | |
|---|---|---|
| CA | 1252430 A | 6/1984 |
| JP | 3601737 B2 | 12/2004 |

* cited by examiner

*Primary Examiner* — Yolanda R Cumbess

(57) ABSTRACT

Provided is a robotic device including: a chassis including a set of wheels; one or more motors for driving the set of wheels; a suspension system; a rechargeable battery for providing power to the robotic device; a controller for controlling movement of the robotic device; a processor; a set of sensors; and, a signal boosting device. Further provided is a method for providing a mobile signal boost including: providing a robotic device including: a chassis including a set of wheels; a motor for driving the set of wheels; a suspension system; a rechargeable battery for providing power to the device; a control system module for controlling the movement of the device; a processor; and, a set of sensors; providing a signal boosting device coupled to the robotic device; and, transporting the signal boosting device to one or more locations within an environment of the robotic device by the robotic device.

20 Claims, 6 Drawing Sheets

AUTONOMOUS SIGNAL BOOSTING ROBOTIC DEVICE

CROSS-REFERENCE TO RELATED APPLICATIONS

This application claims the benefit of Provisional Patent Application No. 62/558,278, filed Sep. 13, 2017, 62/594,136, filed Dec. 4, 2017, and 62/615,435, filed Jan. 9, 2018, each of which is hereby incorporated by reference.

In this patent, certain U.S. patents, U.S. patent applications, or other materials (e.g.) articles) have been incorporated by reference. Specifically, U.S. application Ser. Nos. 15/272,752, 15/949,708, 16/048,179, 16/048,185, 16/163,541, 16/163,562, 16/163,508, 16/185,000, 62/681,965, 62/614,449, 16/109,617, 16/051,328, 15/449,660, 16/041,286, 15/406,890, 14/673,633, 16/163,530, 62/746,688, 62/740,573, 62/740,580, 15/955,480, 15/425,130, 15/955,344, 14/817,952, 16/198,393, 15/981,643, 15/986,670, 62/664,389, 15/447,450, 15/447,623, 62/665,942, 62/617,589, 62/620,352, 15/951,096, 16/130,880, 14/948,620, 16/239,410, 14/859,748, 16/230,805, and 16/127,038 are hereby incorporated by reference. The text of such U.S. Patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

This disclosure relates to robotic devices, and more particularly to item-carrying and item-transporting robotic devices.

BACKGROUND

Mobile robotic devices are becoming increasingly common in consumer homes and commercial spaces. In several instances, mobile robotic devices are beneficial for the convenience they provide. For example, autonomous mobile robotic devices that perform specific tasks such as vacuuming, mopping, mowing, and the like, provide convenience to a user as the tasks are completed by the mobile robotic device without or with minimal human intervention.

A mobile robotic device that can carry and transport items can be useful. For example, a mobile robotic device that can autonomously carry and transport a refuse container back and forth between a storage location and refuse collection location at scheduled times can be useful. In another example, a mobile robotic device that can carry and transport a voice-activated home assistant, such as Google Assistant or Amazon Alexa, can be useful as the robotic device can provide a user with continuous access to the home assistant as they move around an environment. In other instances, a mobile robotic device that can autonomously carry and transport other items such as a bike, a remote control, speakers, food, a laptop, a cell phone, a Wi-Fi router, a signal booster, or any other item can also be beneficial.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects provide a robotic device including: a chassis including a set of wheels; one or more motors for driving the set of wheels; a suspension system; a rechargeable battery for providing power to the robotic device; a controller for controlling movement of the robotic device; a processor; a set of sensors; and, a signal boosting device.

Some aspects include a method for providing a mobile signal boost including: providing a robotic device including: a chassis including a set of wheels; a motor for driving the set of wheels; a suspension system; a rechargeable battery for providing power to the device; a control system module for controlling the movement of the device; a processor; and, a set of sensors; providing a signal boosting device coupled to the robotic device; and, transporting the signal boosting device to one or more locations within an environment of the robotic device by the robotic device.

BRIEF DESCRIPTION OF THE DRAWINGS

FIG. 3 illustrates an example of a robotic device carrying and transporting an item according to some embodiments.

DETAILED DESCRIPTION OF SOME EMBODIMENTS

Figure 1A:
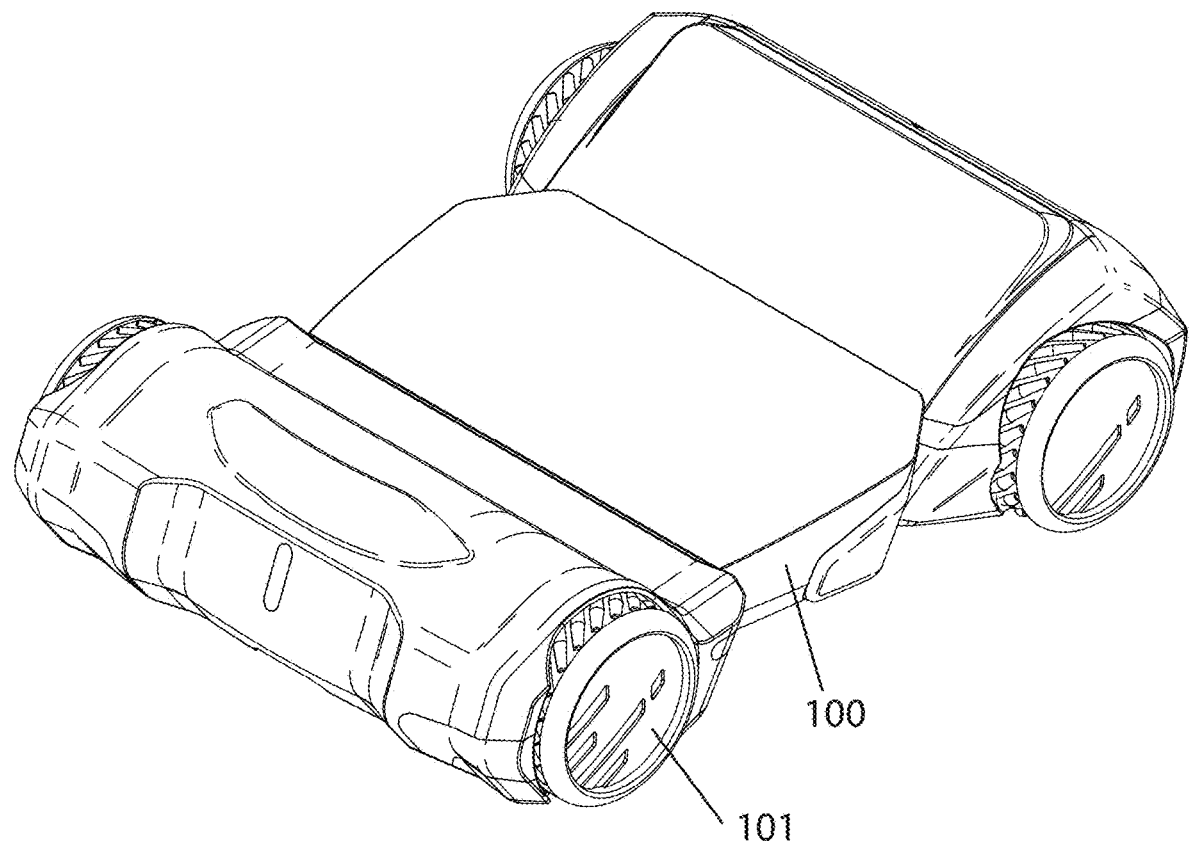
FIGS. 1A and 1B illustrate an example of a robotic device and the robotic device carrying and transporting an item, respectively, according to some embodiments.

The present inventions will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments include an autonomous mobile robotic device that carries and transports items within an environment. The robotic device includes, but is not limited to include, a set of wheels, a power source, a chassis, a suspension system, a rechargeable battery, an actuator, a control module, and a processor. Examples of wheels of a robotic device are described in U.S. Patent Application No. 62/664,389, Ser. Nos. 15/447,450, 15/447,623, and 62/665,942, the entire contents of which are hereby incorporated by reference. Examples of a suspension system are described in U.S. Patent Application No. 62/617,589, 62/620,352, and Ser. No. 15/951,096, the entire contents of which are hereby incorporated by reference. In some embodiments, the robotic device further includes a platform on which items are placed for carrying and transportation. In some embodiments, the robotic device further includes a user interface for, for example, adjusting settings, choosing functions, scheduling tasks. In some embodiments, the robotic device further includes a mapping module for mapping the environment using mapping methods such as those described in U.S. patent application Ser. Nos. 16/048,179, 16/048,185, 16/163,541, 16/163,562, 16/163,508, 16/185,000, 62/681,965, and 62/614,449, the entire contents of which are hereby incorporated by reference. In some embodiments, the robotic device further includes a localization module for localizing the robotic device using localization methods such as those described in U.S. Patent Application Nos. 62/746,688, 62/740,573, 62/740,580, Ser. Nos. 15/955,480, 15/425,130, and 15/955,344 the entire contents of which are hereby incorporated by reference. In some embodiments, the robotic device further includes a path planning module to determine optimal movement paths of the robotic device based on the tasks of the robotic device using path planning methods such as those described in U.S. patent application Ser. Nos. 16/041,286, 15/406,890, and 14/673,633, the entire contents of which are hereby incorporated by reference. In some embodiments, the robotic device includes a scheduling module for setting a schedule of the robotic device using scheduling methods such as those described in U.S. patent application Ser. Nos. 16/051,328 and 15/449,660, the entire contents of which are hereby incorporated by reference. In some embodiments, the robotic device includes sensors such as cameras, LIDAR sensors, LADAR sensors, stereo imaging sensors, optical sensors, imaging sensors, distance sensors, acoustic sensors, motion sensors, obstacle sensors, cliff sensors, floor sensors, debris sensors, time-of-flight sensors, depth sensors, signal transmitters and receivers, signal strength sensor, gyroscope, optical encoders, optical flow sensors, GPS, and other types of sensors. In some embodiments, the robotic device includes a wireless module to wirelessly send and receive information, such as a Wi-Fi module or a Bluetooth module. In some embodiments, the robotic device includes an acoustic sensor to receive verbal commands. In some embodiments, the robotic device includes a built-in signal booster, home assistant device, Wi-Fi router, or other item. In some embodiments, the robotic device is similar to the item-transporting robotic device described in U.S. patent application Ser. No. 16/127,038, the entire contents of which is hereby incorporated by reference.

In some embodiments, the autonomous robotic device carries and transports items within an environment, such a consumer home, a commercial establishment, and a city. In some embodiments, items are built into the robotic device. For example, the robotic device carries and transport a home assistant such as a Google Assistant or Amazon Alexa separate from or built into the robotic device around a consumer home such that a user can have continuous access to the assistant. In another example, a robotic device carries and transports a speaker system separate from or built into the robotic device to a specific room within an environment. Other examples of items the robotic device can carry and transport include, but are not limited to, a mobile phone, a mobile phone charger, a mobile phone docking station, a laptop, a laptop charging station, a Wi-Fi router, a signal booster, a home assistant, a remote control, a refuse container, a recycling bin, a bicycle, food and drinks, storage boxes, laundry basket, luggage, other robotic devices, etc. For instance, a robotic device picks up food from a particular location within an environment (e.g., fast food restaurant, grocery store, kitchen, etc.) and delivers the food to another particular location within the environment (e.g., a particular home, a particular room within a home, etc.). In another example, a robotic device picks up an item purchased online by a user from a warehouse or store and delivers it to the user. In some embodiments, items are carried on a platform of the robotic device. In one example, a robotic device transports a Wi-Fi router or a signal booster around a consumer home such that the Wi-Fi router or signal booster remain a predetermined distance from a user. In some embodiments, the platform includes cavities within which the items are placed. In some embodiments, items are temporarily stored on the robotic device. In some embodiments, the robotic device is stored or parked in at least one specific location until the robotic device is required. For example, a robotic device parks in a particular location of an environment (e.g., particular parking area, a room within a house, etc.) until a processor of the robotic device is provided with instructions to transport an item to one or more particular locations or until executing a scheduled command. For instance, the robotic device storing a refuse container parks in a specific location and transports the refuse container to a refuse collection location at specific times. In another instance, stock of a warehouse is temporarily stored on the robotic device and the robotic device parks in a particular location until the stock is required at which point the robotic device transports the stock to a loading dock for loading. In some embodiments, an item is placed on the robotic device for transportation by, for example, the robotic device, a user, another robotic device or a machine. In some embodiments, one or more items placed on the robotic device is collected from at least one predetermined location at at least one predetermined date and time that may or may not be recurring on a, for example, weekly or bi-weekly basis. For example, a robotic device autonomously transports a refuse or recycling container from a storage location to a predetermined collection location on a recurring bi-weekly basis. In another example, a robotic device picks up office supplies from a stockroom or warehouse or store and delivers the office supplies to one or more establishments for replenishing office supplies such ach paper, toner, pens, and paperclips. In some embodiments, after distributing, delivering, or transporting one or more items or completing a particular task, the robotic device autonomously navigates back to a designated location.

In embodiments, the robotic device can be configured to store, carry or transport various different types of items. For example, the robotic device can be configured to deliver pizza. In some cases, the robotic device is configured to carry an oven and bake the pizza in route to the delivery location. In another example, the robotic device is configured to transport groceries or other food and drink items. In some instances, the robotic device is configured with a fridge or freezer in which the food or drink items can be stored. In one example, the robotic device is configured to carry and transport first aid supplies or a defibrillator and in some cases, is capable of entering a location under fire with the first aid supplies. In other cases, the robotic device is configured to carry and transport a pressure cleaner or other home and car cleaning supplies, an ATM, or luggage. In some instances, the robotic device is configured to carry advertisements and navigate throughout an environment displaying the advertisements. In some embodiments, the robotic device can carry the advertisements while performing other tasks such as delivering items. In some embodiments, the robotic device is configured to push or pull items. For example, in some instances, the robotic device is configured to walk a dog or push hospital beds. In other examples, the robotic device is configured to carry and spread items such as salt or pesticides.

In some embodiments, instructions, scheduling (e.g. pickup, delivery, transportation dates, times, and locations), and other types of information are provided to the processor of the robotic device using an application of a communication device with a graphical user interface paired with the robotic device. Examples of a communication device includes a mobile phone, a tablet, a laptop, a desktop computer, a specialized computer, remote control, etc. For example, a user uses an application of a communication device to command a robotic device transporting a home assistant to remain a particular distance from the user. In another example, a user uses an application of a communication device to command a robotic device to pick up food from a particular restaurant and deliver the food to the home of the user either immediately or at a scheduled time. In one example, a user uses an application of a communication device to schedule recurring pick up of groceries from a particular grocery store and deliver the groceries to a home of the user every Sunday at 3 pm. In some embodiments, other user interfaces such as a web application on an electronic device, a specialized software downloaded on an electronic device, a remote control, a user interface integrated into the robotic device, or another type of device that can communicate with the processor of the robotic device are used to communicate with the robotic device. Examples of a graphical user interface of an application of a communication device that can be used is described in U.S. patent application Ser. Nos. 15/272,752 and 15/949,708, the entire contents of which are hereby incorporated by reference. Examples of methods for providing scheduling information to a robotic device that can be used are described in U.S. patent application Ser. Nos. 16/051,328 and 15/449,660, the entire contents of which are hereby incorporated by reference. Examples of methods for pairing a robotic device with an application of a communication device are described in U.S. patent application Ser. No. 16/109,617, the entire contents of which is hereby incorporated by reference. In some embodiments, verbal instructions are provided to the robotic device by, for example, a user, a specialized computer, another robotic device, or a control system. For example, a user verbally commands a robotic device to transport a particular item such as a laptop, remote control, home assistant, Wi-Fi router, signal booster, or other type of home or office items to a particular location of an environment. In some embodiments, the robotic device executes a particular action when the communication device is within a predetermined range from the robotic device. In some embodiments, the user uses the application of the communication device to provide one or more actions for the robotic device to execute when the communication device is within the predetermined range of the robotic device. For example, a robotic device transports a signal booster to a particular area of the environment upon a processor of the robotic device determining that a communication device of the user is within a predetermined range from the robotic device. In some embodiments, the processor of the robotic device uses information gathered by sensors of the robotic device to determine when to initiate a particular action of the robotic device. For example, a processor of a robotic device instructs the robotic device to pick up and transport a newspaper from a front door of a home of a user to a kitchen of the home upon sensing a shower being turned on prior to noon time. In another example, a processor of a robotic device instructs the robotic device to transport a speaker system such that the speaker system remains in the same room as a user of the robotic device upon detecting a front door of a house of the user opening. In some embodiments, a user provides the instructions, scheduling, and other types of information to the application of the communication device. In some embodiments, the user uses the application of the communication device to further provide and adjust settings and functions of the robotic device, provide and adjust user preferences, and receive information related to the robotic device, as described in U.S. patent application Ser. Nos. 15/272,752 and 15/949,708, the entire contents of which are hereby incorporated by reference.

In some embodiments, the robotic device purchases requested items from a particular location and picks up, transports, and delivers the requested items to one or more specified drop-off locations. In some embodiments, an item is requested using the application of the communication device paired with the robotic device and the processor of the robotic device actuates the robotic device to purchase, pick up, transport, and deliver the item to a particular location specified using the application of the communication device. In some embodiments, the robotic device searches and locates a particular requested item and delivers the item to one or more locations.

In some embodiments, the robotic device includes imaging sensors to capture images of an item and an item recognition module to identify the item. In some embodiments, the item recognition module includes imaging sensors and an image processor. In some embodiments, the application of the communication device is used to instruct the robotic device to autonomously search for an item, and in some cases, pick up, transport, and deliver the item to a particular location. For example, a user instructs a robotic device to find and deliver a tablet to a master bedroom. In some embodiments, images or a live stream video captured by the imaging device as the robotic device navigates within the environment is displayed within the application of the communication paired with the robotic device. In some embodiments, the robotic device is instructed to pick up, transport, and deliver a particular item to a particular location upon detecting the particular item in the images or video captured. In other embodiments, the instruction is provided to the robotic device using voice command, a web application or software paired with the robotic device, a user interface of the robotic device or by other means of communicating with the robotic device. In some embodiments, the item recognition module further determines the characteristics of the item using input from sensors. In some embodiments, characteristics of an item include type, fragility, bulkiness, weight, dimensions, size, shape, stability and the like. In other embodiments, the processor of the robotic device is provided with the characteristics of the item. In some embodiments, a user indicates the characteristics of the item using, for example, an application of a communications device, a remote control, an interface of a robotic device or other means of communication.

In some embodiments, the processor of the robotic device partially determines actions based on environmental characteristics such as terrain, obstacle locations and obstacle density, elevation, and terrain and elevation transitions. For example, a processor of a robotic device chooses a movement path along a flat and smooth driving surface that has no elevation changes from a pickup location to a delivery location of an item if the item being transported is fragile as rough terrain and elevation changes increase the risk of damage to the fragile item. As a further example, a processor of a robotic device alters its movement path upon detecting an elevation change due to a transition between hardwood and carpeted floor types if the robotic device is transporting an item with low stability as the item can fall and become damaged as a result of driving over the transition. In some instances, the processor of the robotic device reduces driving speed if the item, for example, is fragile or has low stability. In some embodiments, preferences for the operation of the robotic device are set based on the characteristics of item being transported. For example, the robotic device is set to only operate on particular types of work surfaces or travel at particular speeds depending on the type of item being carried and transported. In some embodiments, the settings are provided to the processor using an application of a communication device paired with the robotic device, a user interface of the robotic device, a web application paired with the robotic device, or other means of communicating with the robotic device. In some embodiments, the robotic device autonomously adjusts settings based on real-time data collected by sensors and/or history of settings of previously transported items. For example, real-time data from sensors of a robotic device indicate an uneven weight distribution and hence instability of an item being transported and in response a processor of the robotic device adjusts the speed and route of the robotic device to reduce the risk of item damage. In another example, a processor of a robotic device determines a driving speed for transporting a fragile item of medium size using a history of previously transported fragile items of medium size, the history indicating a particular range of speed for which vibration of the fragile items of medium size was minimal. In some embodiments, the processor of the robotic device autonomously learns optimal driving settings for items with different characteristics using machine learning techniques.

In some embodiments, the processor of the robotic device learns which tasks to execute based on the history of tasks performed. For example, a processor of a robotic device learns what items to pick up and deliver based on the history of items picked up and delivered. In some embodiments, the robotic device autonomously executes tasks based on the history of tasks performed. For example, a processor of a robotic device is repeatedly requested robotic device to transport a home assistant around an environment to maintain the home assistant within a predetermined range from a user every day of the week from 5-10 PM except on Saturdays and Sundays. Over time, the processor of the robotic device learns to autonomously transport the home assistant around the environment such that the home assistant remains within a predetermined range from the user every day of the week from 5-10 PM except on Saturdays and Sundays. In another example, a commercial establishment requests pick of particular office supplies from a warehouse and delivery of the office supplies to the commercial establishment every month by a robotic device. Over time, the processor of the robotic device learns to autonomously pick up and deliver the particular office supplies to the commercial establishment every month based on prior history. In some embodiments, requests are provided to the robotic device using the application of the communication device paired with the robotic device or other means of communicating with the robotic device. In some embodiments, the processor of the robotic device requires confirmation by a user prior to autonomously performing tasks based on previous tasks completed. In some embodiments, the user provides confirmation using the application of the communication device paired with the robotic device or other means of communicating with the robotic device. In some embodiments, the robotic device learns what tasks to execute using reinforcement learning (e.g., Markov Decision Process). Examples of learning methods are described in U.S. patent application Ser. Nos. 16/163,530, 16/239,410, 14/859,748, 14/817,952, 16/198, 393, and 16/041,286 the entire contents of which are hereby incorporated by reference.

Figure 1B:
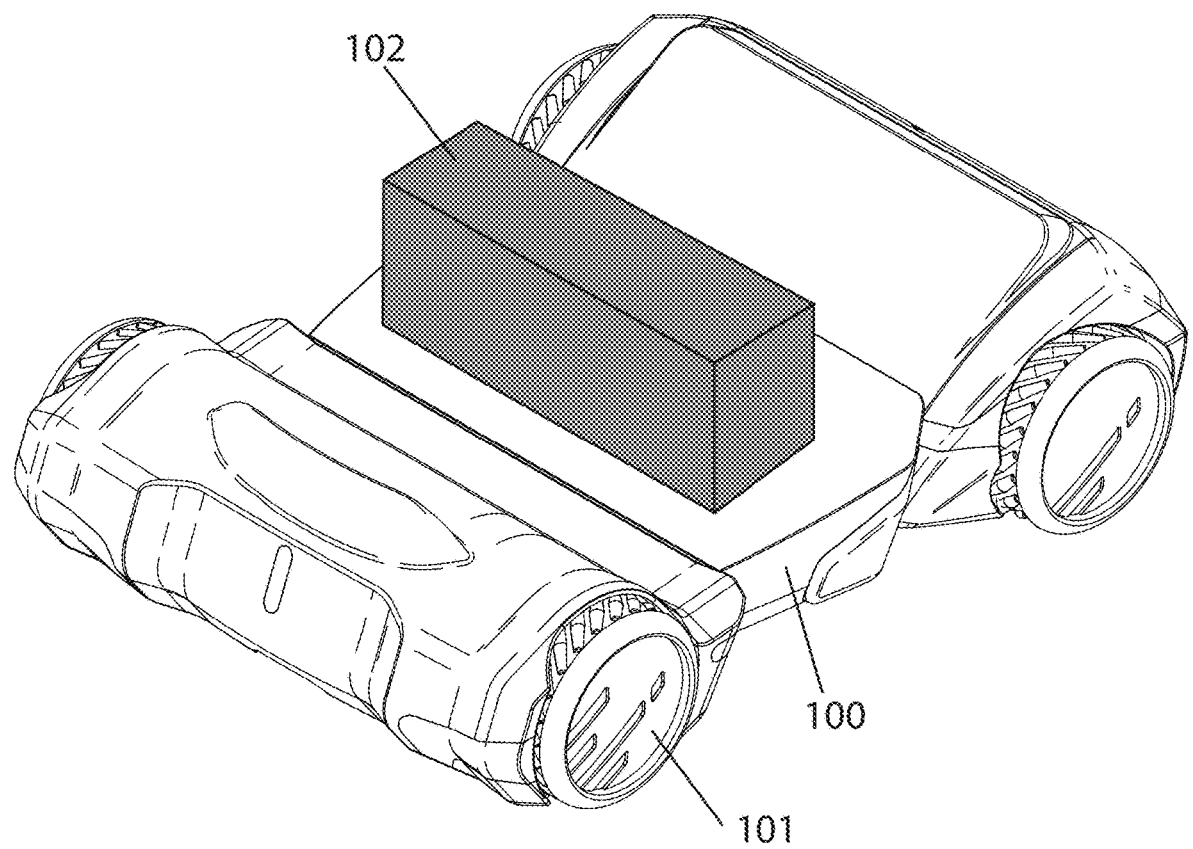

FIG. 1A illustrates an example of a robotic device including platform 100 for carrying and transporting items and wheels 101. In some embodiments, wheels 101 are mecanum wheels such as those described in U.S. Patent Application Nos. 62/664,389, Ser. Nos. 15/447,450, and 15/447, 623, the entire contents of which are hereby incorporated by reference. In some embodiments, the robotic device includes a suspension system such as those described in U.S. Patent Application Nos. 62/665,942, 62/617,589, 62/620,352, and Ser. No. 15/951,096, the entire contents of which are hereby incorporated by reference. FIG. 1B illustrates the robotic device carrying box 102 containing groceries.

Figure 2:
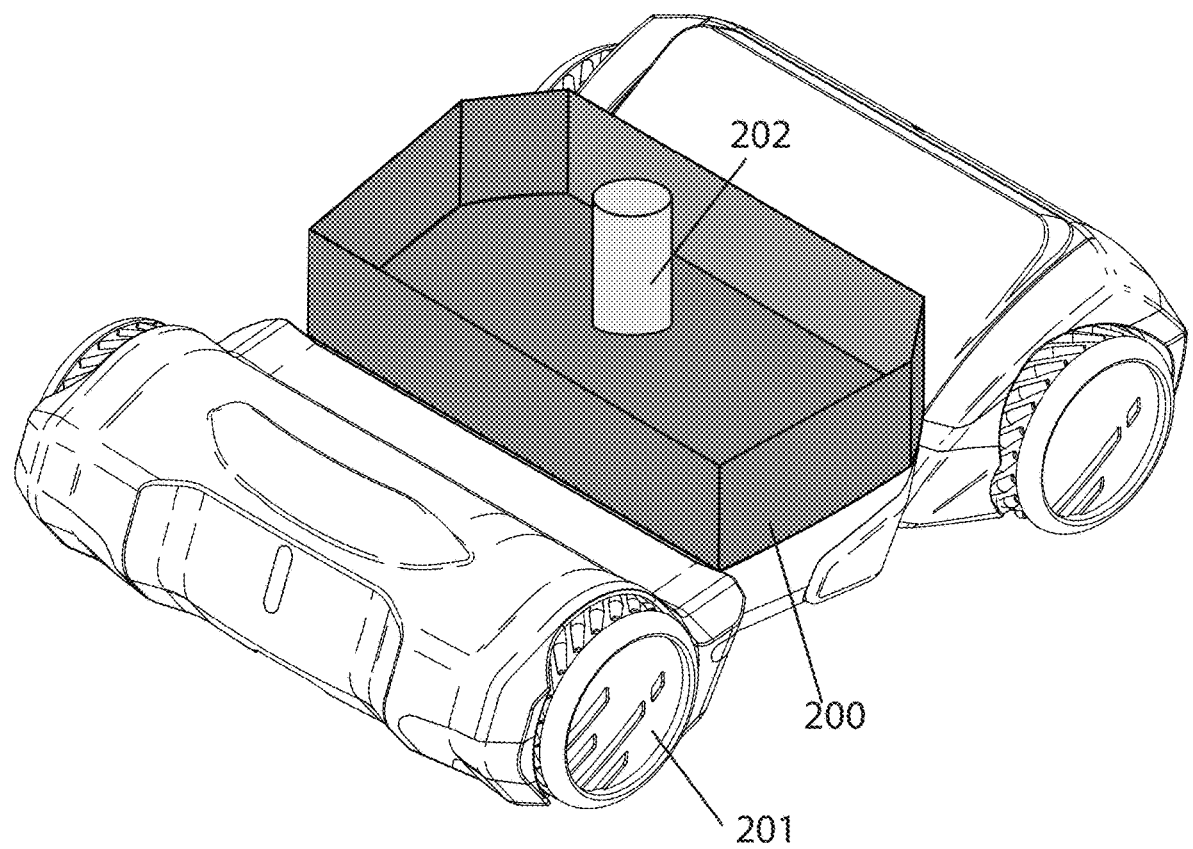
FIG. 2 illustrates an example of a robotic device carrying and transporting an item according to some embodiments.

FIG. 2 illustrates an example of a robotic device including carrying container 200 for carrying and transporting items and wheels 201. The walls of carrying container 200 protect items from falling off of the robotic device. The robotic device carries and transports a home assistant device 202 within carrying container 200. In other instances, the shape and size of the robotic device and carrying container can be different.

Figure 3:
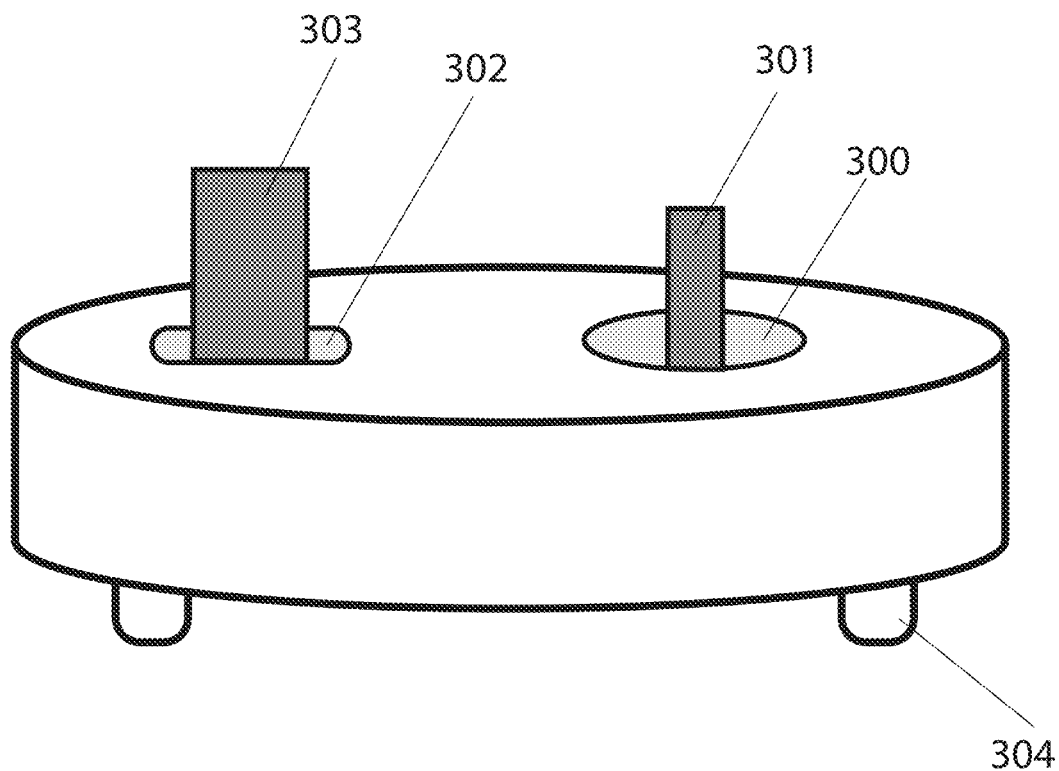
FIG. 3 illustrates an example of a robotic device with cavities carrying and transporting an item according to some embodiments.

FIG. 3 illustrates an example of a robotic device including cavity 300 for carrying and transporting food item 301, built-in docking station 302 for phone 303 and wheels 304.

Figure 4:
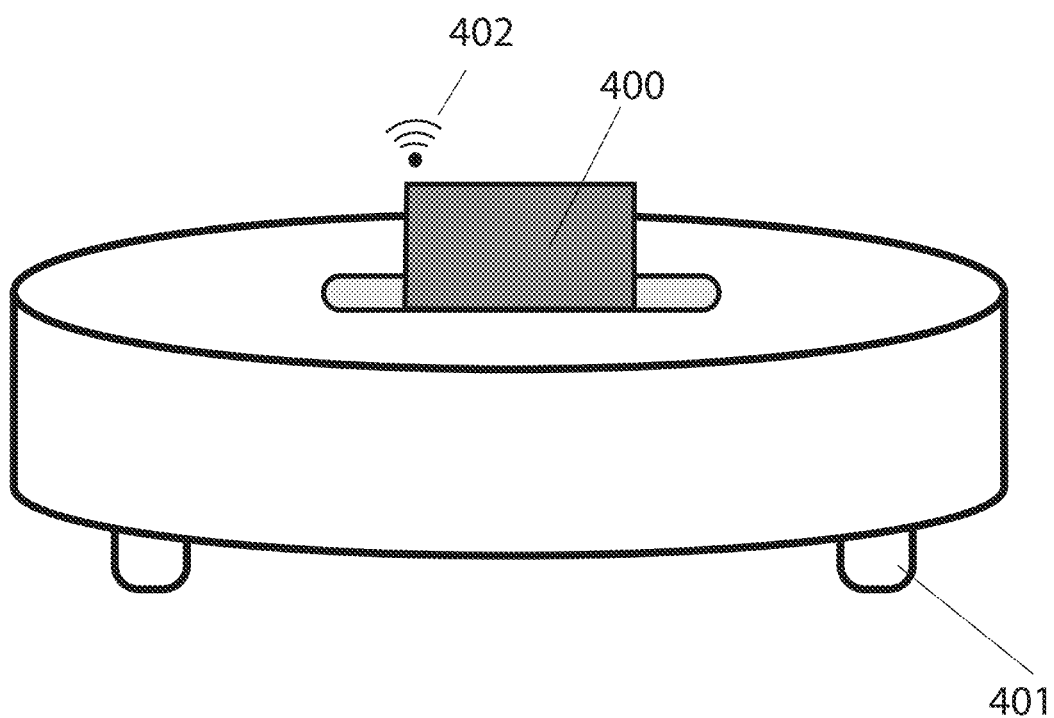
FIG. 4 illustrates an example of a robotic device carrying and transporting an item built into the robotic device according to some embodiments

FIG. 4 illustrates an example of a robotic device with built-in signal boosting device 400 and wheels 401. The robotic device remains within a predetermined distance from a user to continuously provide a signal boost to Wi-Fi signal 402 and subsequently a strong signal strength to the user.

Figure 5:
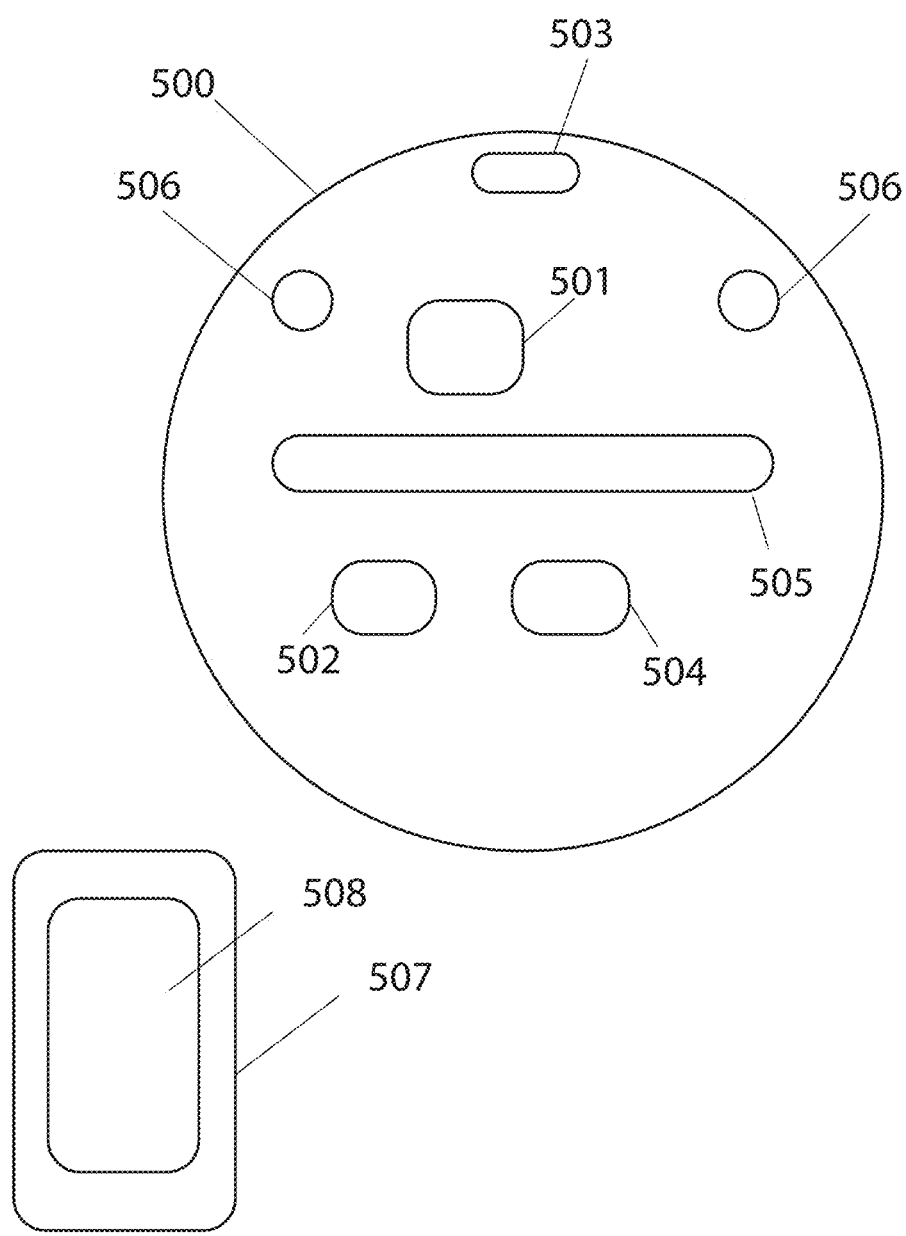
FIG. 5 illustrates an example of a robotic device and an application of a communication device paired with the robotic device according to some embodiments by which the techniques described herein may be implemented.

FIG. 5 illustrates a top view of an example of a robotic device 500 with a processor 501, memory 502, sensor 503, actuator 504, battery 505 and electrical ports 506. In some embodiments, the robotic device 500 may include the features of a robotic device described herein. In some embodiments, program code stored in the memory 502 and executed by the processor 501 may effectuate the operations described herein. Some embodiments additionally include communication device 507 (e.g., mobile device, laptop, remote control, specialized computer, desktop computer, tablet, etc.) having a touchscreen 508 and that executes an application by which the user interfaces with robotic device 500. In some embodiments, processor 501 and memory 502 implement some of the functionality described herein. In some embodiments, a user may provide instructions to robotic device 500 to perform certain tasks or to use certain settings at certain times or in certain areas of the environment using the application of communication device 507 wirelessly paired with robotic device 500.

In some embodiments, the platform or carrying container or other variations of such components are built into the robotic device or are separate components attached to the robotic device for carrying and transporting items. In some embodiments, the robotic device includes cavities in a top surface of the robotic device for holding items securely. For example, slotted cavities in the surface of the robotic device may be present where a mobile router or smart device such as, for example, Amazon Alexa or Google Assistant may be placed securely. In some embodiments, the robotic device includes mechanisms for securing items such as straps, a cover that covers items and attaches and locks to the robotic device, clamps, etc. In some embodiments, the robotic device includes a robotic arm, a forklift, a bed lift, a bucket, or other component or device capable of picking up items.

In some instances, electricity is required for items being carried and transported by the robotic device. For example, a music speaker or a router carried and transported by a robotic device around an environment requires electricity to play music or provide a signal, respectively. In some embodiments, the robotic device includes one or more electrical ports that provide electricity to items carried and transported by the robotic device or to provide electricity to items within an environment. In some embodiments, the robotic device provides electrical ports for items located in areas of the environment having a lack of electrical ports. For example, a user can request a robotic device including electrical sockets to navigate to a location in an environment lacking electrical sockets such that the user can charge their laptop device. In another example, an owner of a conference center can request a robotic device including electrical ports to navigate to a location within the conference center lacking electrical ports. In some embodiments, the one or more electrical ports can include an electrical socket, a smartphone charging port, a tablet charging port, a home assistant charging port, or other types of ports and connectors that can provide items with electricity. In some embodiments, the robotic device provides items with electricity using a rechargeable battery of the robotic device, a rechargeable battery separate from a main rechargeable battery of the robotic device, solar energy, or another energy source.

In some embodiments, the processor of the robotic device learns a movement path by physically directing the robotic device along the movement path or by using a remote control or an application of a communication device paired with the robotic device to direct the robotic device along the movement path. For example, the robotic device learns a path between a first location and a second location by physically wheeling the robotic device along a path through the environment from the first location to the second location. In some embodiments, path learning is initiated by pressing a start button on the robotic device or on any other device capable of communicating with the robotic device, voice activation or autonomously upon startup. In some embodiments, path learning is completed by pressing an end button on the robotic device or on any other device capable of communicating with the robotic device, voice activation, or autonomously upon detecting no movement of the robotic device. Path learning is initiated when the robotic device is positioned at the first location of the robotic device and completed after the robotic device has navigated along the movement path to the second location. In some embodiments, there are multiple locations along the movement path between the first and second location in which the robotic device stops. In some embodiments, wherein the path of the robotic device comprises driving one way along a movement path and returning back in the same way along the same movement path, path learning is initiated when the robotic device is positioned at the first location and completed after the robotic device has navigated to the location in which the robotic device it to turn around and return back along the same path to the first location. Alternatively, in some embodiments, path learning is initiated and completed using the application of the communication device paired with the robotic device. In some embodiments, the application of the communication device is used to mark the movement path of the robotic device within a map of the environment that is shared with the robotic device. During path learning, the processor of the robotic device determines its location within an internal map of the environment while simultaneously mapping the environment using localization methods referred above. In some instances, the processor of the robotic device marks observed obstacles in the working environment within the internal map of the environment. In other embodiments, the processor of the robotic device determines a movement path using path planning methods such as those described in U.S. patent application Ser. Nos. 16/041,286, 15/406,890, 14/673,633, 16/163,530, 14/817,952, 16/198,393, and 16/239,410, the entire contents of which are hereby incorporated by reference.

In some embodiments, the processor of the robotic device generates an alert when an unanticipated obstacle blocking the path of the robotic device is encountered during execution of a task. In some embodiments, the robotic device generates an alert by generating a noise, sending a message to the application of the communication device paired with the robotic device or any other device paired with the robotic device, displaying a message on a screen of the robotic device, illuminating lights, and the like. In some embodiments, the processor autonomously instructs the robotic device to pick up, carry, and transport the obstacle to a particular location and in some cases, unload the obstacle. In some embodiments, the application of the communication device provides the instruction to the processor which then actuates the robotic device to pick up, carry, and transport the obstacle.

In some embodiments, the item to be transported is built into the robotic device. For example, items such as a music system, a router, a home or work assistant, a television, or other types of home or office items are built into the robotic device. In some embodiments, the item is detachable from the robotic device.

In some embodiments in particular, a signal booster is built into the robotic device. In some embodiments, the signal booster is detachable from the robotic device. In some embodiments, the robotic device carries and transports a signal booster that is separate from the robotic device. In some embodiments, the signal booster plugs into a power source provided by the robotic device as described above. In some embodiments, the signal booster takes a preexisting signal, such as a wireless internet signal from a router or a cellular signal from a cellphone tower, and amplifies and rebroadcasts the signal to boost the signal strength. In some embodiments, the application of the communication device paired with the robotic device is used to instruct the robotic device to transport the signal boosting device to a particular location within the environment using a map of the environment displayed on the communication device using the application. In some embodiments, the application of the communication device is used to instruct the processor of the robotic device to actuate the robotic device to remain a predetermined distance from the user or from the communication device paired with the robotic device when the user is present within the environment (e.g., a home environment). In some embodiments, the application of the communication device is used to instruct the processor of the robotic device to actuate the robotic device to transport the signal booster to a particular location or remain a predetermined distance from the user or from the communication device paired with the robotic device when the user is present within the environment (e.g., a home environment). In some embodiments, the robotic device autonomously transports the signal boosting device to one or more locations within the environment of the robotic device at one or more predetermined times. The one or more locations can include, for example, an area within which the user of the robotic device is located, an area within which maximum user activity occurs relative to other areas within the environment, an area located within a predetermined range from the user of the robotic device or from the communication device paired with the robotic device, and locations that provide stronger signal strength to the communication device of the user relative to other locations within the environment. In some embodiments, the user uses the application to notify the robotic device that it is present within the environment and the processor of the robotic device actuates the robotic device to transport the signal booster close to the user. In other embodiments, the robotic device autonomously detects when the user is present within the environment using sensors such as, motion sensors, acoustic sensors, etc. In some embodiments, a schedule is set using the application of the communication device to instruct the robotic device to, for example, position itself at particular location within the environment on particular days and times or to remain with a predetermined distance from the paired communication device or user on particular days and times. In some embodiments, signal boosting can be activated and deactivated. In some embodiments, sensors of the robotic device determine the strength of a signal and if it is below a predetermined threshold the processor of the robotic device activates signal boosting and if it above the predetermined threshold deactivates signal boosting. In some embodiments, the signal strength measured by sensors of the robotic device is the signal strength received by the robotic device and in other embodiments, the signal strength measured is the signal strength received by the communication device. In some embodiments, the application of the communication device paired with the robotic device is used to communicate the signal strength received by the communication device. In some embodiments, the processor of the robotic device learns the most optimal positions within the environment to provide strong signal strength in all areas of the environment or in particular areas of the environment as indicated by the user using the application of the communication device or in the particular area that the user is currently located. In some embodiments, the processor uses a Markov Decision Process to learn the most optimal positions within the environment to provide strong signal strength in all areas of the environment or in particular areas of the environment as indicated by a user using the application of the communication device or in the particular area that the user is currently located. In some embodiments, the processor of the robotic device determines the optimal position of the signal booster for each separate area within the environment such that the processor knows where to instruct the robotic device to position itself when the user is located within a particular area of the environment. In some embodiments, a charging station of the robotic device includes a signal booster.

In some embodiments, the processor of the robotic device collaborates with other processors of robotic devices within the same environment by sharing collaborative intelligence. For example, processors of two robotic vacuum devices collaborate with one another to complete cleaning of an area within an environment, by splitting the area to be covered and sharing areas that have been covered with one another to avoid repeat coverage. In some embodiments, a signal sent from another robotic device within the same environment initiates the robotic device to execute one or more particular actions (e.g., pick up, transport, deliver, or distribute a particular item). For example, a processor of a robotic stove sends a signal to item-transporting robotic device when the robotic stove is turned on, initiating the item-transporting robotic device to transport a music player into the kitchen such that a user can listen to music while cooking. In some embodiments, multiple robotic devices within the same environment collaborate such that one or more items can be shared among multiple users, consumer homes, commercial establishments, etc. For example, a robotic device transports a lawn mower between multiple locations such that the lawn mower is shared among multiple consumer homes or commercial establishments. Examples of collaborative methods for robotic devices are described in U.S. patent application Ser. Nos. 15/981,643, 15/986,670, 16/130,880, 14/948,620, and 16/185,000, the entire contents of which are hereby incorporated by reference.

In some embodiments, a control system provides instructions, scheduling (e.g. pickup, delivery, transportation dates, times, and locations), and other types of information are provided to the processor of the robotic device. In some embodiments, robotic device instructions, robotic device scheduling, robotic device settings and functions, and user preferences of the robotic device corresponding to a particular user of the robotic device are set within the control system or are provided to the control system using an application of a communication device paired with the robotic device. In some embodiments, the control system instructs the robotic device to execute tasks such as those described above. For example, a control system instructs a robotic device to transport a work assistant device around a work environment such that the work assistant device remains within a predetermined distance from a communication device of a particular user of the robotic device upon the control system detecting the particular user entering the work environment. In another example, a control system instructs a robotic device with a built-in music player to play music and follow a user around a home environment upon detecting the user entering the home environment and instructs the robotic device to stop playing music and dock at a charging station upon detecting the user leaving the home environment. In one example, a control system instructs a robotic device to remain in a particular location during certain times of the day based on instructions received by the control system from an application of a communication device paired with the robotic device. In some embodiments, the control system detects a location of a user using sensors such as imaging device or using a signal sent from the application of the communication device paired with the control system or the robotic device. An example of a control system for managing one or more robotic devices is described in U.S. patent application Ser. No. 16/130,880, the entire contents of which is hereby incorporated by reference.

In some embodiments, the processor of the robotic device has speech capabilities. In some embodiments, the processor of the robotic device verbally communicates with a user, an operator, a control system, another robotic device, a specialized computer, or other types of devices capable of understanding verbal communication. For example, a processor of a robotic device verbally communicates its status, its emotion (e.g., happy, sad, satisfied, unsatisfied, angry, conflicted, etc.), robotic device tasks, warnings, or any other type of information with an operator of the robotic device. Other examples of information that can be communicated include a current location of the robotic device, an item picked up, transported, or delivered by the robotic device, a pickup, delivery, or storage location of an item, completion/incompletion of a task, stalled warning, collision with an obstruction warning, device damage warning, etc. In some embodiments, the robotic device may also communicate an emotion using similar methods. In some embodiments, information is communicated to a user, an operator, a control system, another robotic device, a specialized computer, or any other type of device using other communication methods. For example, information is communicated to a user or operator using an application of a communication device paired with the robotic device.

In some embodiments sensors of the robotic device capture images of a user within the environment and the processor identifies the user based on the features of the user in the captured images. In some embodiments, the processor loads particular robotic device settings and user preferences and actuates the robotic device to execute particular instructions upon identifying the user. For example, a processor of a robotic device actuates the robotic device to deliver a specific type of coffee to a desk of a user upon the processor identifying the user as they enter the work environment.

In some embodiments, the robotic device is configured to transport items by pushing or pulling the one or more items. In some embodiments, the robotic device is configured to transport items by pushing or pulling a component separate from the robotic device that can carry items. In some embodiments, the robotic device includes a mechanism, such as an arm with a hook or arms, for pulling or pushing items or a component within which items are held. For example, a robotic device transports a shopping cart from a first location to a second location by pushing it. In another example, a robotic device transports a wagon from one location to another by pulling it. In one example, a robotic device transports a robotic vacuum from a first location to a second location by pushing a carrying container with wheels within which the robotic vacuum is contained.

In some embodiments, the robotic device includes a versatile mobile robotic chassis that can be customized in terms of hardware, software and structure based on the function of the robotic device. An example of a customizable versatile mobile robotic is described in U.S. patent application Ser. No. 16/230,805, the entire contents of which is hereby incorporated by reference.

In some embodiments, the battery of the robotic device is charged by directly plugging into a socket, or by connecting with a charging station. In some embodiments, the battery of the robotic device is charged by connecting with a charging station that is powered using solar energy. In some embodiments, the robotic device incudes solar panels and is powered using solar energy.

The figures provided herein are intended solely for the purpose of illustrating examples of some embodiments and are not intended to limit the scope, shape or design of the inventions disclosed. Other designs are possible without deviating from the scope of the inventions disclosed.

Various embodiments are described herein below, including methods and techniques. It should be kept in mind that the invention might also cover articles of manufacture that include a computer-readable medium on which computer-readable instructions for carrying out embodiments of the inventive technique are stored. The computer-readable medium may include semiconductor, magnetic, opto-magnetic, optical, or other forms of computer-readable medium for storing computer-readable code. Further, the invention may also cover apparatuses for practicing embodiments of the invention. Such apparatus may include circuits, dedicated and/or programmable, to carry out tasks pertaining to embodiments of the invention. Examples of such apparatus include a computer and/or a dedicated computing device when appropriately programmed and may include a combination of a computer/computing device and dedicated/programmable circuits adapted for the various tasks pertaining to embodiments of the invention.

In block diagrams provided herein, illustrated components are depicted as discrete functional blocks, but embodiments are not limited to systems in which the functionality described herein is organized as illustrated. The functionality provided by each of the components may be provided by software or hardware modules that are differently organized than is presently depicted. For example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, the applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The present techniques will be better understood with reference to the following enumerated embodiments:

1. A robotic device comprising: a chassis including a set of wheels; one or more motors for driving the set of wheels; a suspension system; a rechargeable battery for providing power to the robotic device; a controller for controlling movement of the robotic device; a processor; a set of sensors; and, a signal boosting device.

2. The robotic device of embodiment 1, wherein the signal boosting device is built into the robotic device.

3. The robotic device of embodiments 1-2, wherein the signal boosting device is separate from the robotic device and the robotic device carries the signal boosting device on a platform of the robotic device.

4. The robotic device of embodiments 1-3, wherein the signal boosting device is attached to the robotic device and is detachable from the robotic device.

5. The robotic device of embodiments 1-4 further comprising one or more electrical sockets.

6. The robotic device of embodiments 1-5, wherein the processor of the robotic device is instructed to actuate the robotic device to transport the signal boosting device to a location within an environment of the robotic device instantly or at a predetermined time using an application of a communication device paired with the robotic device.

7. The robotic device of embodiment 6, wherein the communication device comprises one or more of the following: a mobile phone, a tablet, a laptop, a desktop computer, and a remote control.

8. The robotic device of embodiments 1-7, wherein the robotic device autonomously transports the signal boosting device to one or more locations within the environment of the robotic device.

9. The robotic device of embodiment 8, wherein the one or more locations comprises an area within which a user of the robotic device is located.

10. The robotic device of claim 8, wherein the one or more locations comprises an area within which maximum user activity occurs relative to other areas within the environment.

11. The robotic device of embodiment 8, wherein the one or more locations comprises an area located within a predetermined range from the user of the robotic device or from the communication device paired with the robotic device.

12. The robotic device of embodiment 8, wherein the one or more locations provide stronger signal strength to the communication device paired with the robotic device relative to other locations within the environment.

13. The robotic device of embodiment 8, wherein the robotic device autonomously transports itself to the one or more locations at one or more predetermined times.

14. The robotic device of embodiments 1-13, wherein the signal boosting device amplifies a wireless Wi-Fi signal of a router.

15. A method for providing a mobile signal boost comprising: providing a robotic device comprising: a chassis including a set of wheels; a motor for driving the set of wheels; a suspension system; a rechargeable battery for providing power to the device; a control system module for controlling the movement of the device; a processor; and, a set of sensors; providing a signal boosting device coupled to the robotic device; and, transporting the signal boosting device to one or more locations within an environment of the robotic device by the robotic device.

16. The method of embodiment 15, wherein the processor of the robotic device is instructed to actuate the robotic device to transport the signal boosting device to the one or more locations within the environment of the robotic device instantly or at a predetermined time using an application of a communication device paired with the robotic device.

17. The method of embodiment 16, wherein the communication device comprises one or more of the following: a mobile phone, a tablet, a laptop, a desktop computer, and a remote control.

18. The method of embodiments 15-17, wherein the robotic device autonomously transports the signal boosting device to the one or more locations within the environment of the robotic device.

19. The method of embodiment 18, wherein the one or more locations comprises an area within which a user of the robotic device is located or within which maximum user activity occurs relative to other areas within the environment.

20. The method of embodiment 18, wherein the one or more locations comprises an area located within a predetermined range from the user of the robotic device or from the communication device paired with the robotic device.

The invention claimed is:

1. A robotic device comprising:
a chassis including a set of wheels;
one or more motors for driving the set of wheels;
a suspension system;
a rechargeable battery for providing power to the robotic device;
a controller for controlling movement of the robotic device;
a processor;
a set of sensors; and,
a signal boosting device;
wherein:
the robotic device autonomously transports the signal boosting device to one or more locations within the environment of the robotic device; and
the one or more locations comprises at least an area within which maximum user activity occurs relative to other areas within the environment.

2. The robotic device of claim 1, wherein the signal boosting device is built into the robotic device.

3. The robotic device of claim 1, wherein the signal boosting device is separate from the robotic device and the robotic device carries the signal boosting device on a platform of the robotic device.

4. The robotic device of claim 1, wherein the signal boosting device is attached to the robotic device and is detachable from the robotic device.

5. The robotic device of claim 1 further comprising one or more electrical sockets.

6. The robotic device of claim 1, wherein the processor of the robotic device is instructed to actuate the robotic device to transport the signal boosting device to a location within an environment of the robotic device instantly or at a predetermined time using an application of a communication device paired with the robotic device.

7. The robotic device of claim 6, wherein the communication device comprises one or more of the following: a mobile phone, a tablet, a laptop, a desktop computer, and a remote control.

8. The robotic device of claim 1, wherein the one or more locations further comprises an area within which a user of the robotic device is located.

9. The robotic device of claim 1, wherein the one or more locations further comprises an area located within a predetermined range from the user of the robotic device or from the communication device paired with the robotic device.

10. The method of claim 9, wherein the signal boosting device amplifies a wireless Wi-Fi signal of a router.

11. The robotic device of claim 1, wherein the one or more locations provide stronger signal strength to the communication device paired with the robotic device relative to other locations within the environment.

12. The robotic device of claim 1, wherein the robotic device autonomously transports itself to the one or more locations at one or more predetermined times.

13. The robotic device of claim 1, wherein the signal boosting device amplifies a wireless Wi-Fi signal of a router.

14. A method for providing a mobile signal boost comprising:
providing a robotic device comprising:
a chassis including a set of wheels;
a motor for driving the set of wheels;
a suspension system;
a rechargeable battery for providing power to the device;
a control system module for controlling the movement of the device;
a processor; and,
a set of sensors;
providing a signal boosting device coupled to the robotic device; and,
transporting the signal boosting device to one or more locations within an environment of the robotic device by the robotic device;
wherein:
the robotic device autonomously transports the signal boosting device to the one or more locations within the environment of the robotic device; and
the one or more locations comprises at least an area within which a user of the robotic device is located or within which maximum user activity occurs relative to other areas within the environment.

15. The method of claim 14, wherein the processor of the robotic device is instructed to actuate the robotic device to transport the signal boosting device to the one or more locations within the environment of the robotic device instantly or at a predetermined time using an application of a communication device paired with the robotic device.

16. The method of claim 15, wherein the communication device comprises one or more of the following: a mobile phone, a tablet, a laptop, a desktop computer, and a remote control.

17. The method of claim 14, wherein the one or more locations further comprises an area located within a predetermined range from the user of the robotic device or from the communication device paired with the robotic device.

18. The method of claim 14, wherein the one or more locations provide stronger signal strength to the communication device paired with the robotic device relative to other locations within the environment.

19. The method of claim 14, wherein the robotic device autonomously transports itself to the one or more locations at one or more predetermined times.

20. The method of claim 14, wherein the robotic device comprises one or more electrical sockets.

\* \* \* \* \*